(No Model.)
T. T. WOODRUFF.
SURVEYING INSTRUMENT.
No. 263,278. Patented Aug. 22, 1882.
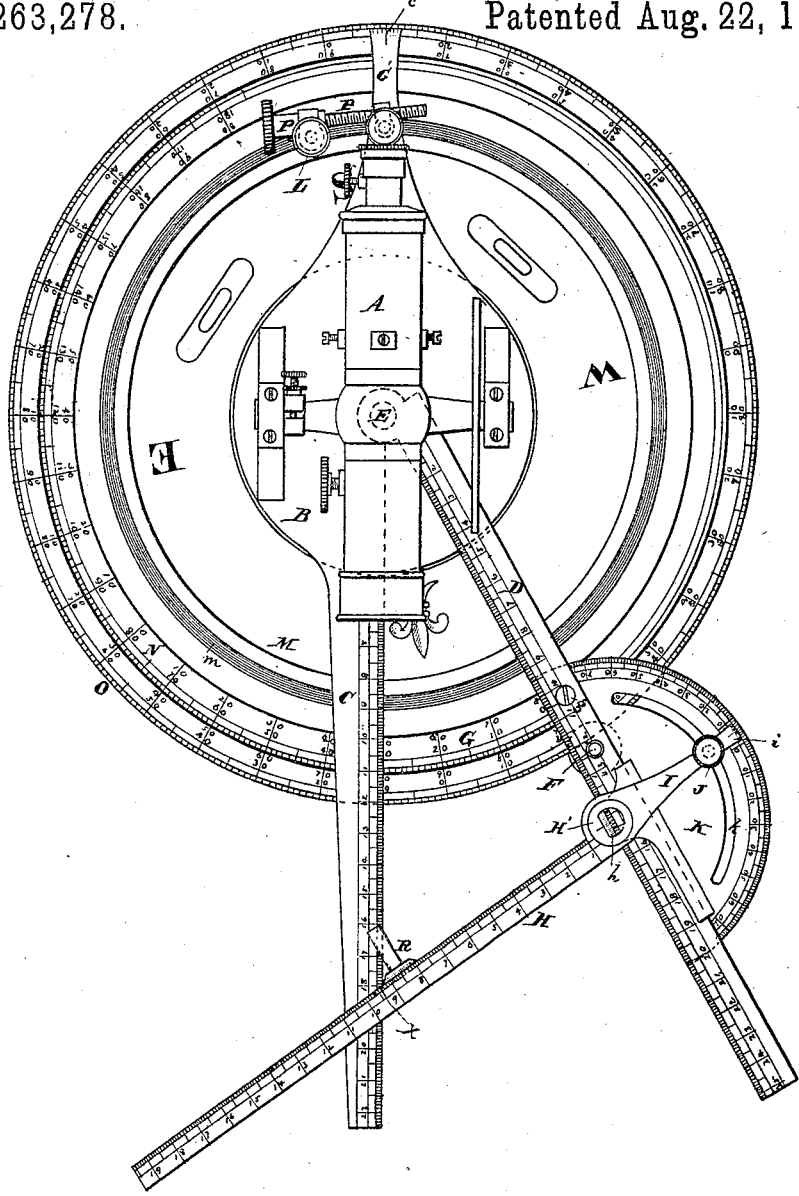
Attests
Wm L. Button
Inventor
Theodor T. Woodruff
By his atty

UNITED STATES PATENT OFFICE.

THEODORE T. WOODRUFF, OF PHILADELPHIA, PENNSYLVANIA, ASSIGNOR TO ELIZA M. WOODRUFF, OF SAME PLACE.

SURVEYING-INSTRUMENT.

SPECIFICATION forming part of Letters Patent No. 263,278, dated August 22, 1882.

Application filed August 29, 1881. (No model.)

*To all whom it may concern:*

Be it known that I, THEODORE T. WOODRUFF, of the city of Philadelphia, county of Philadelphia, and State of Pennsylvania, have invented an Improvement in Surveying-Instruments, of which the following is a specification.

My invention relates to surveying-instruments; and it consists in the combination of a number of scales adapted to work in connection with each other and operate separately or in conjunction with a transit or other equivalent surveying-instrument, whereby said scales can be set to form a triangle homologous to a triangular piece of ground; and in supplying said scales with arcs or circular scales having the degrees marked thereon for the purpose of indicating the angle included between any two of the three scales; and, finally, in minor details of construction, all of which are more fully set forth in the following specification.

The object of this invention is to construct an instrument adapted to surveying purposes, by which the angle or length of a given boundary-line may be ascertained, to find the distance between two points one or both of which are inaccessible, to ascertain the contents or area of a given field, to find the course to desired objects, and to tell the height of an object above the horizontal without calculating by figures. By means of the scales as herein constructed all of this can be accomplished and read at sight, thereby saving much time and insuring positive results.

In the drawings is shown a plan view of a transit with my improvement attached thereto.

A is the telescope of the transit, and is supported upon its base-plate by the usual standards. The plate B, provided with the scale-arm C and adjusting-arm C', carrying the vernier $c$, is pivoted at E to the plate M, which is provided with the clamping-groove $m$ and degree-circle O.

Working in the groove $m$ and adapted to be secured in any position is the clamp L, which is furnished with the adjusting-screw P, working in a nut on arm C' for setting the arm C accurately to any angle.

Pivoted at E is the arm D, which is secured to the degree-ring G at $g$, and with which it moves, said ring G indicating the angle between the scale-arms C and D. The arm D may be clamped in any position by a clamping-screw, F; or the clamping device, which may be of any ordinary construction, may work through the ring G and secure it in any position to plate M.

Sliding upon the arm D is an arc or degree circle or segment, K, to which is pivoted at H' the arm H, provided with the adjusting-arm I, furnished at the pivot and other end with vernier-scales $h$ and $i$. The arm I is adjusted and clamped in position by a clamp, J, and slot $k$.

A movable or pocket vernier, R, may be used to accurately read the scale-arms H and C where they cross, as shown.

The scale of degrees O is used to give the angle of the transit and also to set the scale-arm C, and the scale of degrees on ring G is used to give the angle between the scale-arms C and D at the point E. The scale of degrees on segment K is used to give the angle made by the scale-arm H with the scale-arms D and data from which the angle made by arms H and C may be found. The said arms C, D, and H are divided in tenths of a foot, and may correspond to any distance desired.

In using this instrument to measure to or between distant points, and also the height of elevated or depth of depressed points, by which the true horizontal distances are shown, including courses and angles, first lay off a base-line extending from right to left. Measure its length by a steel tape, so that you have the true horizontal distance or length thereof. Then plant the transit at the left extremity of the said base-line. Then swing the telescope, with scale-arm C, to bear upon a distant object, and clamp it to plate M at L, which holds scale-arm C in place. Then bring scale-arm D around to and in line with scale-arm C and clamp it to the plate M by screw-clamp F. Then let loose clamp L and C' and swing the telescope, which always carries scale-arm C with it, and set it to bear upon the right extremity of the said base-line, and clamp it to plate M at L, as before. Here take the bearing of the two lines of the degree-scale O and the angle of the same lines on degree-scale G. Then set on the degree-scale K the scale-arm H to correspond with the angle to be formed by the said lines H and D. Move the transit to and plant it upon the right extremity of the said base-line. Then swing the telescope, as before directed, to bear upon the left extremity of the said base-line and clamp to plate M at L and C', as before. Then move scale-arm D around to and in line with scale-arm C and clamp it to plate M at F. Then let loose clamp L and swing the telescope, as before, to bear upon the aforesaid distant object, and clamp it at L, as before. Then, with scale-arm H and degree-scale K set at the angle of D and H, as found at the left extremity of the said base-line, place the said degee-scale K upon scale-arm D, with the arm H reaching across D and C and crossing D at its index distance corresponding to the length of the said base-line. Then look on scale-arm H at its crossing-point with scale-arm C and read the distance from the left extremity of the base-line to the said distant object. Next look on scale-arm C at the same crossing-point and read the distance from the right extremity of the said base-line to the said distant object, and in like manner get the distance to a second distant point.

To ascertain the distance and course between two distant points, set scale-arm D, by the process before described, to bear upon the left-hand distant object and scale-arm C to bear upon the right-hand distant object. Then place scale-arm H across scale-arm C and D, so as to bisect the distance-graduation on each of the two said arms, and by the degree-scale K find the degree made by D and H, and on H at its crossing with C read the distance between the two distant points. If desired, you can find the angle made by the arms H and C in the formula by reversing the arm H upon the same line and measure the degree of the angle by the degree-scale K.

To find the course between two distant objects, look on degree-scale G, which is a counterpart to the degree-scale K, and find the degree corresponding with the degree of the angle made by arms H and D. Now, arm H represents the course between the two distant points, and a line drawn from the pivot-center of the transit-plate so as to bisect the degree found on the degree-scale G will also bisect the degree on degree-scale O, which is the true course of the line between the two distant points. The precise course of scale-arm H may be found on degree-scale O by application of a screw-micrometer applied upon the periphery of plate M with a radial arm which will lap over the degree-scale G at the degree designated by the degree-scale K, the said radial arm crossing degree-scale O at the degree of the course of arm H.

To reduce an ascending or descending air-line measure to a true horizontal measure, first find the air-line, as before described, and substitute the air-line distance so found as the hypotenuse of a right-angle triangle. Then set the scale-arms C and D at the angle of ascent or descent, as the case may be, which angle will be ascertained by the telescope and vertical degree-scale. On scale C find the air-line distance, and, with the scale-arm H and degree-scale K set at ninety degrees, apply the same to scale-arm D, so that the arm H will cross the arm C at the air-line distance on scale C, so as to form a right angle. Then on arm H read the elevation or depression, as the case may be. Then on arm D read the true horizontal-distance measure.

I am aware of the patents granted to Lilley in 1857, and do not claim anything shown or described in those patents.

I am aware of the patents to Dickinson, February 21, 1860, and George, June 20, 1871, and do not claim anything therein shown or specified.

Having now described my invention, what I claim as new, and desire to secure by Letters Patent, is—

1. In a surveying-instrument, a plate, M, having its periphery divided into degrees, forming a scale, O, in combination with a transit, A, having its base-plate B pivoted to said plate M at E, scale-arm C, secured to plate B, means to adjust the transit and the arm C upon the plate M and secure it in such position, a scale-arm, D, pivoted to the arm C at E and secured to a degree-scale, G, which is arranged in the face of plate M and concentric with degree-scale O and pivot E, said scale G being adapted to slide or rotate in its groove, a segment, K, provided with a degree-scale, said segment being adapted to slide upon scale-arm D, and scale-arm H, pivoted to said segment on a line with the scale-marks on scale-arm D, the whole being arranged to form a complete instrument upon which distances, courses, angles, elevations, and depressions can be read at sight upon the scale-arms, &c., substantially as and for the purpose specified.

2. In a surveying-instrument, two scale-arms hinged together at the pivotal point of a transit, one of which is rigidly secured to one degree-scale and the other adjustably secured to another degree-scale and rigidly secured to the transit, said degree-scales being made concentric, in combination with said degree-scales, means to secure said scale-arms in any position relative to one another, a third scale-arm adapted to slide upon one of said arms and provided with a degree-scale, and means to secure said arm in position upon its degree-scale, substantially as and for the purpose specified.

3. In a surveying-instrument, the combination of transit A with scale-arm C, with its clamping and adjusting device P L, scale-arm D, pivoted at E to arm C, and provided with a clamp, F, scale-arm H, pivoted to segment K, adapted to slide upon arm D, and provided with clamp J, plate M, with groove m and degree-scale O, and ring degree-scale G, substantially as and for the purpose specified.

In testimony of which invention I hereunto set my hand.

THEODORE T. WOODRUFF.

Witnesses:
R. A. CAVIN,
LISLE STOKES.